Patented Aug. 22, 1939

2,170,625

UNITED STATES PATENT OFFICE 2,170,625

STABILIZATION OF ALDEHYDES

Joseph A. Wyler, Allentown, Pa., assignor to Trojan Powder Company, Allentown, Pa.

No Drawing. Application March 28, 1938, Serial No. 198,489

5 Claims. (Cl. 23—250)

This invention relates to a process and to a composition of matter, and particularly relates to stabilizing aldehydic solutions against light and air.

An object of this invention is to provide an aqueous solution of an aldehyde, such as acetaldehyde, propionaldehyde, etc. which remains colorless upon storage, under the ordinary conditions of industry and commerce.

A further object is to provide a solution of acetaldehyde which is not only resistant toward the chemical effects of air and light, but serves as a preventative of certain undesirable reactions during the manufacture of pentaerythritol from acetaldehyde and formaldehyde—this latter discovery being the basis of a separate application now in preparation.

A still further object of this invention is to remove the brown color already formed in aldehydes by the action of light and air.

Other and further objects will become apparent upon a perusal of this specification and appended claims.

It is well known that commercial aldehydes, particularly acetaldehyde, are affected by oxygen of the air, by sunlight and by a combination of these agents. The most readily observable effect of these agents is the changing of the color of the solutions from colorless to yellow to brown and then to actual precipitation of a brownish colored resin. Other effects, not so easily recognizable, also take place simultaneously.

Now, I have discovered that the addition of small amounts of certain agents to commercial aldehydes prevents the formation of these brown colored products and also provides an aldehydic solution which reacts differently (more satisfactorily) than do the untreated aldehydic solutions under the same conditions of alkalinity, temperature, etc.

I have discovered that the addition of an oxalate to, for instance, a 60% solution of acetaldehyde in water produces a mixture which remains colorless for months or longer when stored under conditions where it is subjected to ordinary daylight and oxygen of the air.

Examples of oxalates which I may use are the following: sodium, potassium, ammonium, calcium, barium, strontium, aluminum, copper, cobalt, nickel, iron, chromium, cerium, hydrogen, urea, aniline oxalates, etc.

The proportion of oxalates to aldehyde may be varied over a wide range, depending upon the particular aldehyde, its quality, and the purpose for which the aldehyde is to be used. I have found, for instance, that a mere trace of calcium oxalate may be sufficient in certain cases, whereas, in certain other cases a much more soluble oxalate, such as sodium oxalate, is needed. In general, I prefer to use less than one-hundredth of one percent of the oxalate, based on the total weight of the aldehydic solution, but I may use up to, say 5%, or even more, by weight in certain cases.

It will be observed that certain of the oxalates, which I find useful, are themselves colored products. This, however, does not destroy their operativeness. Copper oxalate, for instance, is so difficultly soluble that it does not impart a detrimental color to the aldehydic solution. In the case of iron oxalate and chromium oxalate, I prefer to use only small percentages. Furthermore, depending upon the use to which the aldehydic solutions are to be put, certain colors present in the aldehyde do no harm whatever, provided these colors are due to the oxalates themselves and not to resinous materials formed from aldehyde.

In order to point out my invention more clearly, the following examples are given:

Example 1

To about 500 pounds of acetaldehyde (60% commercial) at ordinary temperature, add about one-half pound of sodium oxalate in the form of a water solution and mix.

Example 2

To about 500 pounds of acetaldehyde (60% commercial) add about one-tenth of a pound of cupric oxalate and mix. Not all the copper oxalate dissolves, but the excess does no harm, and for certain uses of the aldehyde its presence is beneficial.

Although the examples given mention only acetaldehyde, the other saturated aliphatic aldehydes, as formaldehyde, propionaldehyde, butyraldehyde, etc., are the full equivalents of acetaldehyde, in the present invention.

I do not confine myself to the particular conditions indicated in the examples. Thus, I may vary the proportions, the concentrations, the temperature of mixing, the manner and order of mixing of the ingredients, etc., without departing from the essence of my invention. Or, I may cause the aldehydic solution to pass through a filter bed containing the relatively insoluble oxalates, in order to effect the stabilizing of this solution. The essential characteristic is that the oxalate ion be brought in contact with the aldehydic solution.

As many apparently widely different embodiments of this invention may be made without departing from the spirit and scope thereof, it is to be understood that no limitations are to be made upon my invention, except as defined in the appended claims.

I claim:

1. A composition of matter comprising, in solution, one or more saturated aliphatic aldehydes, water and an oxalate, said oxalate being present in minor proportions.

2. A composition of matter comprising, in solution, one or more saturated aliphatic aldehydes, water and sodium oxalate, said oxalate being present in minor proportions.

3. A composition of matter comprising, in solution, one or more saturated aliphatic aldehydes, water and urea oxalate, said oxalate being present in minor proportions.

4. A composition of matter comprising, in solution, acetaldehyde, water and an oxalate, said oxalate being present in minor proportions.

5. A composition of matter comprising, in solution, acetaldehyde, water and sodium oxalate, said oxalate being present to an extent not exceeding one molecule of $Na_2C_2O_4$ for 300 molecules of $CH_3CHO$.

JOSEPH A. WYLER.